United States Patent
Matsubara et al.

(10) Patent No.: US 6,675,060 B1
(45) Date of Patent: Jan. 6, 2004

(54) APPARATUS AND METHOD FOR CREATING MACHINING REGION DATA

(75) Inventors: Susumu Matsubara, Chiyoda-ku (JP); Kenji Iriguchi, Chiyoda-ku (JP); Kiyotaka Kato, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 568 days.

(21) Appl. No.: 09/679,074

(22) Filed: Oct. 5, 2000

(30) Foreign Application Priority Data

Oct. 22, 1999 (JP) .......................................... 11-300644

(51) Int. Cl.$^7$ ............................................... G06F 19/00
(52) U.S. Cl. ........................ 700/182; 700/159; 700/160
(58) Field of Search ................................. 700/159, 160, 700/179–184, 186, 118

(56) References Cited

U.S. PATENT DOCUMENTS 5,289,382 A * 2/1994 Goto .......................... 700/179
5,293,321 A * 3/1994 Fujita et al. ................. 700/184
5,993,042 A * 11/1999 Matsubara et al. .......... 700/118

FOREIGN PATENT DOCUMENTS

| JP | A1 10-49214 | 2/1998 |
|----|-------------|--------|
| JP | A2 11-212615 | 8/1999 |

* cited by examiner

Primary Examiner—Leo Picard
Assistant Examiner—Steven R. Garland
(74) Attorney, Agent, or Firm—Leydig, Voit & Mayer, Ltd.

(57) ABSTRACT

A machining region data creation apparatus and a machining region data creation method simplifying provision of machining information concerning multiple boring regions. In the machining region data creation apparatus decoding inputted three-dimensional shape data to create machining data for machining a work piece based on the decoding result, a boring region extraction unit receives three-dimensional finish shape data and extracts shapes of boring regions based on the three-dimensional finish shape data, a boring region analysis unit analyzes the shapes and the features of the boring regions based on three-dimensional shape data of each boring region, and a boring region classification unit classifies the boring regions based on the shapes and the features of the boring regions.

6 Claims, 6 Drawing Sheets

GROUP 2

GROUP 3

GROUP 4

GROUP 5

GROUP 6

APPARATUS AND METHOD FOR CREATING MACHINING REGION DATA

BACKGROUND OF THE INVENTION

The present invention relates to an apparatus and a method for creating machining region data used for boring by NC (numerical control) cutting from CAD (computer aided design) data obtained by a CAD system.

A conventional apparatus for creating a machining process drawing is disclosed in, Unexamined Japanese Patent Application Publication No. Hei 10-49214. As shown in FIG. 14, this machining process drawing creation apparatus includes graphics input means 101 for inputting CAD part drawings and material shapes to create external outline shapes and hole outline shapes, means 102 for providing attributes of machining in directions perpendicular and parallel directions to a machine shaft, and surface kinds such as an end surface, outer diameter surface or inner diameter surface by indicating the machine shaft and the machining direction relative to graphic elements constructing the external outline shapes, the hole outline shapes and the material shapes in CAD part graphics, means 103 for overlaying and arranging the outline shapes and the material shapes to create shapes of machining regions formed by the graphic elements constructing the outline shapes and the material shapes, means 104 for creating machining shapes in a machining process by expansibly and contractibly deforming the shape of the machining regions according to the graphic attributes, and means 105 capable of storing the data processed by each the means and referring to the data if desired.

In such a conventional machining process drawing creation apparatus, the machining process drawing for creating NC machining data for boring can be easily created on the basis of the CAD part drawings, and creation of attribute data is facilitated with reference to the graphic elements constructing shapes of the boring. When the number of boring shapes is small, there is no problem in creation by the machining process drawing creation apparatus, but when the number of boring shapes increases, the attribute data is created according to the number of borings, so that the creation of the attribute data concerning the boring shapes becomes difficult.

SUMMARY OF THE INVENTION

Therefore, it is an object of the invention to simplify input of boring information for multiple borings when performing the borings based on CAD data.

A machining region data creation apparatus according to a first configuration of the invention, which decodes inputted three-dimensional shape data to create machining data for machining a work material based on the decoding result, comprises machining finish shape input means for inputting three-dimensional finish shape data, boring region extraction means for extracting shapes of boring regions based on the inputted three-dimensional finish shape data, boring region analysis means for analyzing the shapes and features of the boring regions based on three-dimensional shape data of the boring regions, and boring region classification means for classifying the boring regions based on the shapes and the features of the boring regions.

A machining region data creation method according to a second configuration of the invention, which decodes inputted three-dimensional shape data to create machining data for machining a work material based on the decoding result, comprises the steps of: inputting three-dimensional finish shape data, extracting shapes of boring regions based on this three-dimensional finish shape data, analyzing the shapes and features of the boring regions based on three-dimensional shape data of each the boring region, and classifying the boring regions based on the shapes and the features of the boring regions.

A machining region data creation apparatus according to a third configuration of the invention comprises means for calculating bore diameters of the boring regions and directions of machine shafts as the boring region analysis means.

In a machining region data creation method according to a fourth configuration of the invention, the step of analyzing the shapes and features of the boring regions based on three-dimensional shape data of each the boring region is performed by calculating bore diameters of the boring regions and directions of machine shafts.

DESCRIPTION OF THE PREFERRED EMBODIMENTS

First Embodiment

Figure 1:
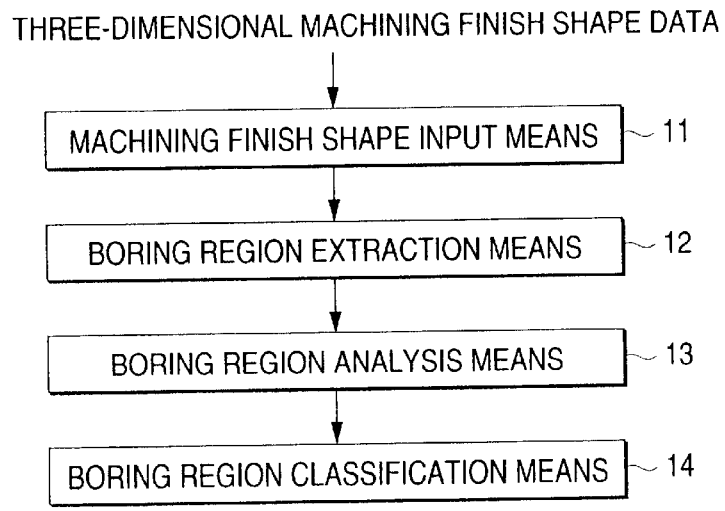
FIG. 1 is a flowchart showing a configuration in a first embodiment of the invention.

An embodiment of the invention will be described below with reference to the accompanying drawings. FIG. 1 is a flowchart showing a configuration of a machining region data creation apparatus and a machining region data creation method in a first embodiment of the invention.

In FIG. 1, numeral 11 is machining finish shape input means for inputting a three-dimensional machining finish shape to be machined from a work material by an NC cutting machine. Numeral 12 is boring region extraction means for extracting shapes of boring regions according to the machining finish shape obtained by the machining finish shape input means 11. Numeral 13 is boring region analysis means for analyzing the shapes of the boring regions obtained by the boring region extraction means 12 and determining bore diameters, heights of the end of bores, directions of machine shafts, and kinds of bores (through bore or not). Numeral 14 is boring region classification means for classifying to group each the boring region (machining region data) based on boring information about the bore diameters, heights of the end of bores, directions of machine shafts, and kinds of bores (through bore or not) analyzed by the boring region analysis means 13, that is, features of the shapes and machining of the boring regions.

Operations of the machining region data creation apparatus and the machining region data creation method having such a configuration will be described in detail with reference to FIGS. 2 to 8.

Figure 2A:
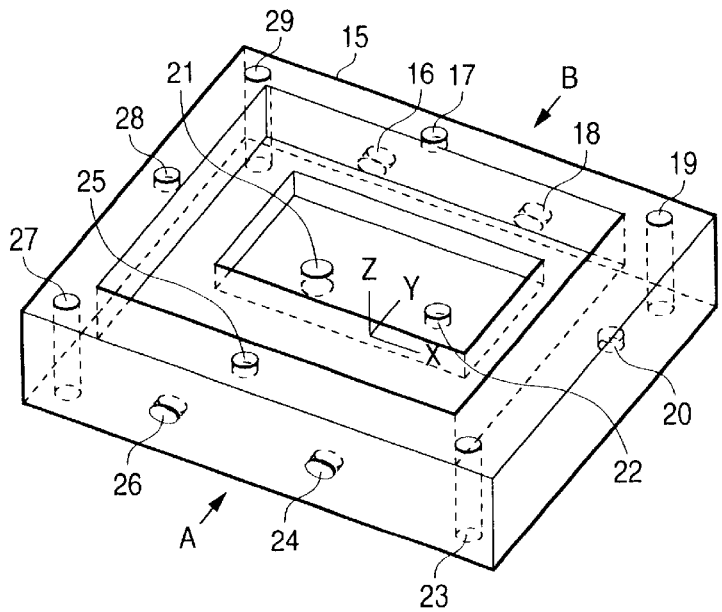
FIGS. 2A and 2B are perspective views illustrating the configuration in the first embodiment of the invention.
Figure 2B:
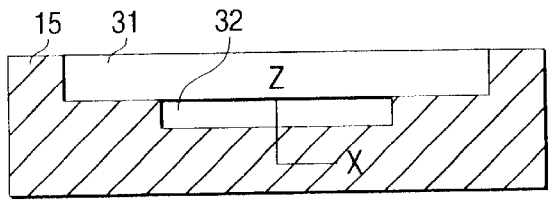

FIG. 2 is a perspective view showing a machining finish shape of a target work material 15 by an orthogonal coordinate (XYZ) system, and FIG. 2A shows shapes of each machining region and numerals 16 to 29 are 14 boring regions (cylindrical shapes) formed in the work material 15 by cutting. FIG. 2B is a sectional view taken on line A–B and shows a sectional shape of the work material of FIG. 2A, but the shapes of the boring regions are omitted. Further, a recess portion 31 is formed in the work material 15 as a machining region and also a recess portion 32 is formed in this recess portion 31. In FIG. 2A, the boring regions 17, 19, 23, 25, 27, 28 and 29 are cut in sidewall portions of the work material 15 in a Z direction, and the boring regions 16, 18, 24 and 26 are cut in the sidewall portions of the work material 15 in a Y direction. Furthermore, the boring regions 21 and 22 are formed in the bottom of the recess portion 32 of the work material 15 in a Z direction.

Figure 3:
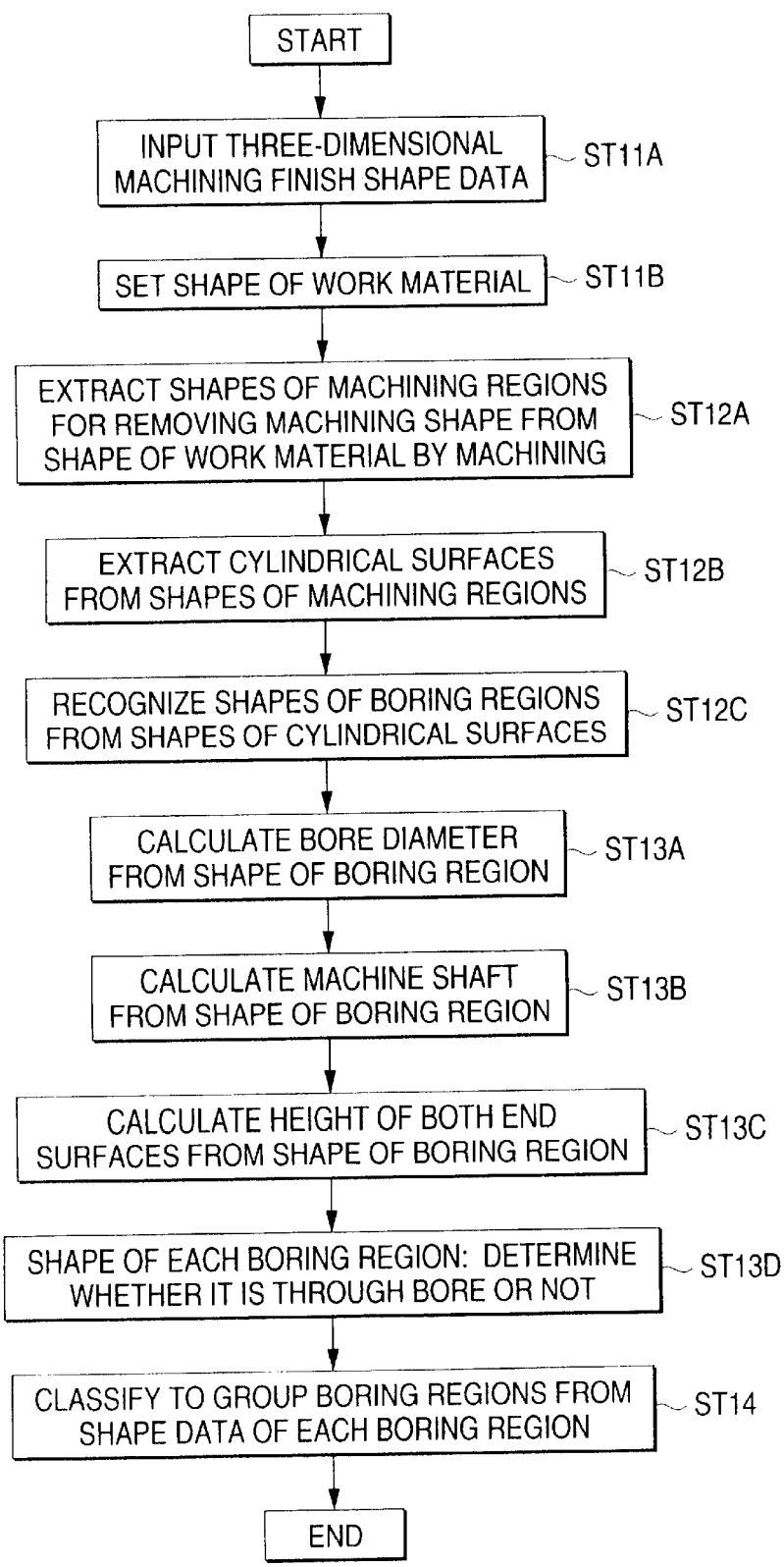
FIG. 3 is a flowchart showing operations in the first embodiment of the invention.

Operations of the machining region data creation apparatus and the machining region data creation method for creating machining region data for machining the work material will be described below by way of FIG. 3.

Figure 4:
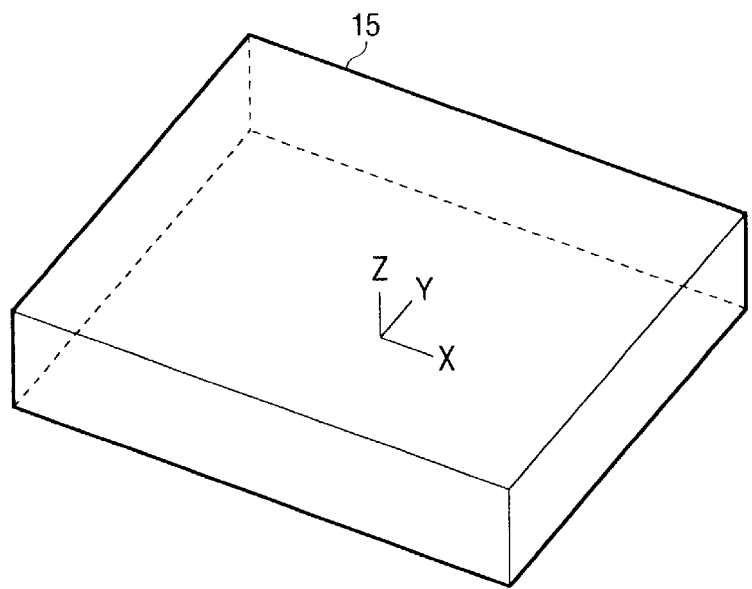
FIG. 4 is a construction view showing a shape of a work material in the first embodiment of the invention.

First, data of a solid model indicating the three-dimensional machining finish shape of the work material 15 to be machined as shown in FIG. 2 is inputted (ST11A). Next, data of the solid model about a shape of the work material 15 as shown in FIG. 4 is set (ST11B).

Figure 5:
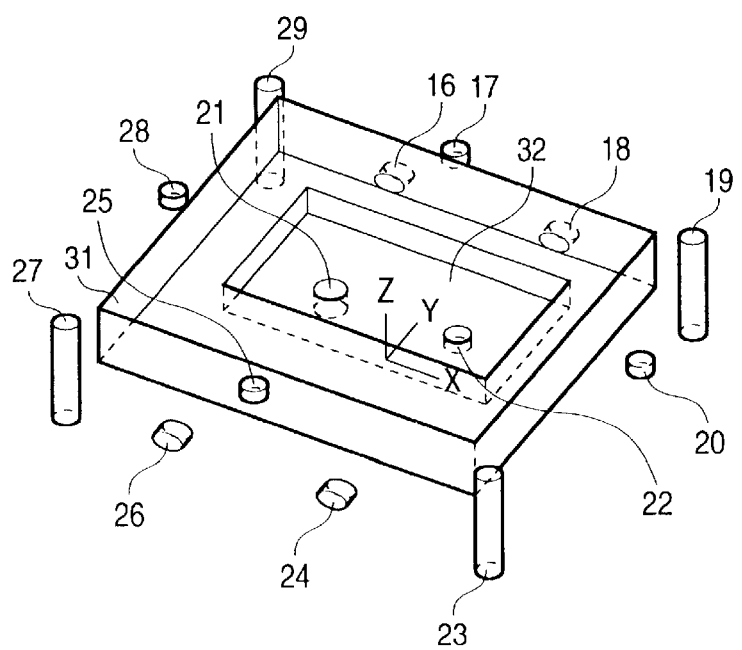
FIG. 5 is an explanatory diagram showing machining regions in the first embodiment of the invention.

Shapes of machining regions for removing the machining finish shape shown in FIG. 2 from the shape of the set work material 15 by cutting are extracted (ST12A). These shapes of the machining regions are indicated in FIG. 5 by an orthogonal coordinate system (XYZ). The kinds of shapes of each the machining regions in FIG. 5 include boring regions 14 and recess portions described above, and like numerals are designated to associate them with the shapes of each of the machining regions in the machining finish shape of FIG. 2. Next, since the shapes of these machining regions include the boring regions and the recess portions, only the boring regions (cylinder) need to be extracted. For that reason, first, cylindrical surfaces (shapes of the side) 14 are extracted, as shown by the orthogonal coordinate system in FIG. 6, from the three-dimensional machining finish shape data (data of the solid model) in which cylindrical surfaces constructing the boring regions are input in ST11A (ST12B).

Figure 6:
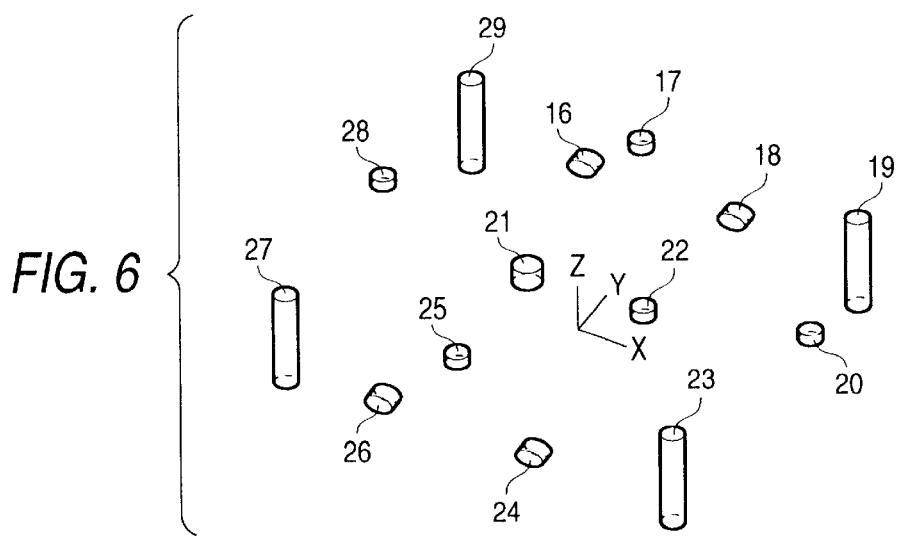
FIG. 6 is an explanatory diagram showing cylindrical surfaces in the first embodiment of the invention.
Figure 7:
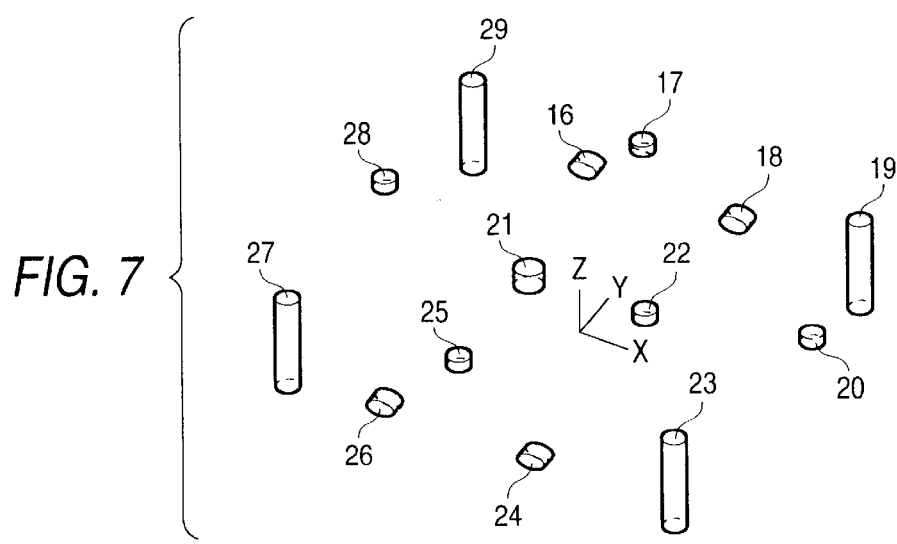
FIG. 7 is an explanatory diagram showing boring regions in the first embodiment of the invention.
Figure 8:
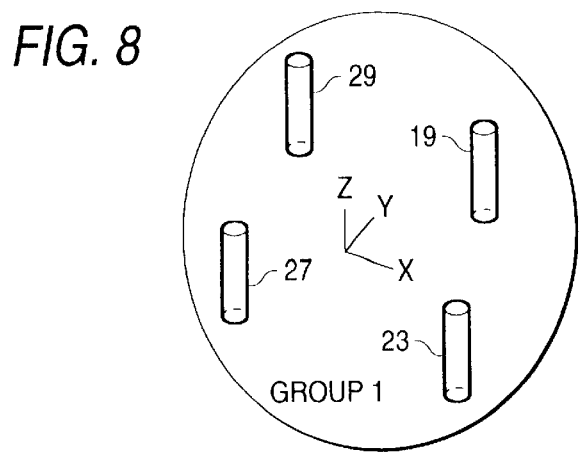
FIG. 8 is an explanatory diagram showing a group 1 in the first embodiment of the invention.

Since these extracted cylindrical surfaces are not necessarily the boring regions, and since the recess portions may be included, a size of a diameter of each the cylindrical surface is next calculated from the three-dimensional machining finish shape data (data of the solid model). If the size, as compared with a predetermined value, is smaller than the predetermined value, it is determined that the cylindrical surface is the boring region (ST12C). The determined boring regions are indicated in FIG. 7 by the orthogonal coordinate system. Incidentally, the reason why the boring regions of FIG. 7 coincide with those of FIG. 6 is that there are no machining regions with a bore diameter larger than the predetermined value. In case there is a machining region with a bore diameter larger than the predetermined value, this machining region is not cut by boring but by facing, so that it is finally determined that the cylindrical surface is not a boring region and it is not indicated in FIG. 7.

The bore diameter is calculated on the basis of shape data of the determined boring region (ST13A). In like manner, a direction of a machine shaft in the orthogonal coordinate system is calculated from the shape data of the boring region (ST13B). Subsequently, a height (orthogonal coordinate system) to both the end surfaces of the cylinder in the direction of the machine shaft is calculated from the shape data of the boring region (ST13C). Finally, it is determined whether the boring region is a through bore or not by making an inside and outside determination referred to as the machining finish shape shown in FIG. 2A from the shape data of both the end surfaces (ST13D).

In steps ST13A, ST13B, ST13C and ST13D, the bore diameters, the directions of the machine shafts in the orthogonal coordinate system, the heights of the end surface (upper surface), the heights of the end surface (lower surface), and the kinds of 14 boring region shapes (cylinder) calculated respectively are shown in the following Table as a list.

TABLE 1

| Bore No. | Bore Diameter (mm) | Machine Shaft | Height of End Surface (Upper Surface) | Height of End Surface (Lower Surface) | Kind |
| --- | --- | --- | --- | --- | --- |
| 27 | 10 | 0,0,1 | Z = 40 | Z = 0 | Through |
| 26 | 10 | 0,−1,0 | Y = −100 | Y = −90 | No Through |
| 25 | 8 | 0,0,1 | Z = 40 | Z = 35 | No Through |
| 24 | 10 | 0,−1,0 | Y = −100 | Y = −90 | No Through |
| 23 | 10 | 0,0,1 | Z = 40 | Z = 0 | Through |
| 20 | 10 | 0,0,1 | Z = 40 | Z = 35 | No Through |
| 22 | 12 | 0,0,1 | Z = 10 | Z = 5 | No Through |
| 21 | 12 | 0,0,1 | Z = 10 | Z = 0 | Through |
| 28 | 8 | 0,0,1 | Z = 40 | Z = 35 | No Through |
| 29 | 10 | 0,0,1 | Z = 40 | Z = 0 | Through |
| 16 | 10 | 0,1,0 | Z = 100 | Y = 90 | No Through |
| 17 | 8 | 0,0,1 | Z = 40 | Z = 35 | No Through |
| 18 | 10 | 0,1,0 | Y = 100 | Y = 90 | No Through |
| 19 | 10 | 0,0,1 | Z = 40 | Z = 0 | Through |

Figure 9:
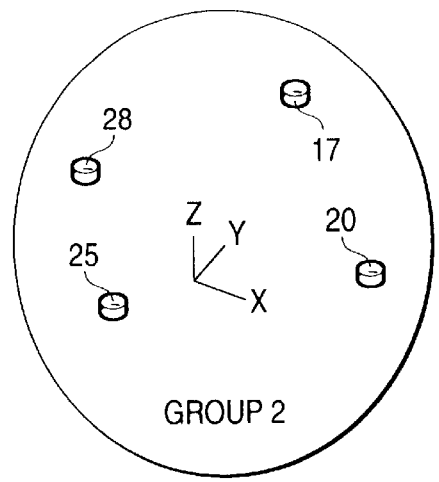
FIG. 9 is an explanatory diagram showing a group 2 in the first embodiment of the invention.
Figure 10:
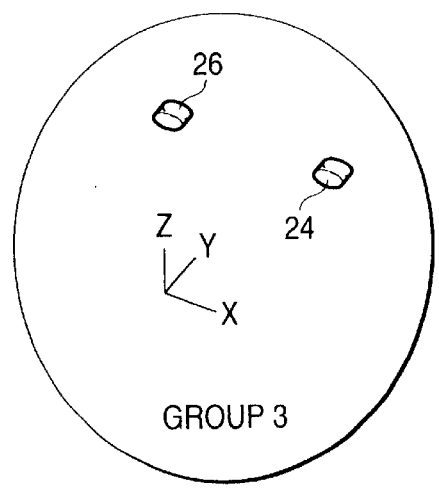
FIG. 10 is an explanatory diagram showing a group 3 in the first embodiment of the invention.
Figure 11:
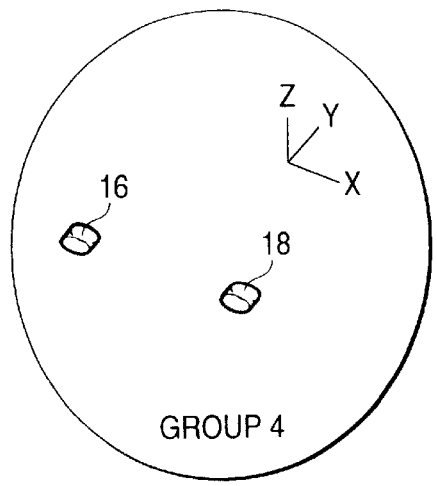
FIG. 11 is an explanatory diagram showing a group 4 in the first embodiment of the invention.
Figure 12:
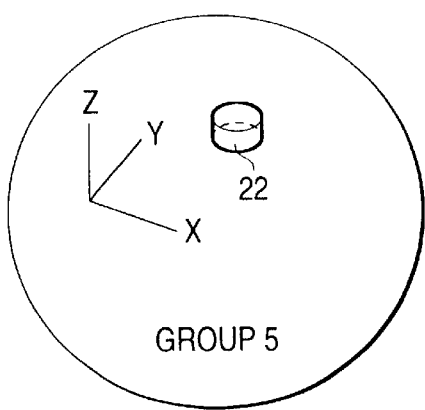
FIG. 12 is an explanatory diagram showing a group 5 in the first embodiment of the invention.
Figure 13:
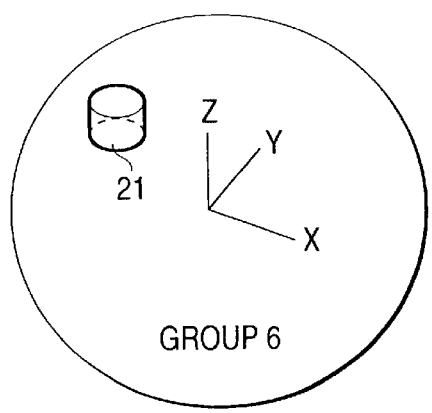
FIG. 13 is an explanatory diagram showing a group 6 in the first embodiment of the invention.
Figure 14:
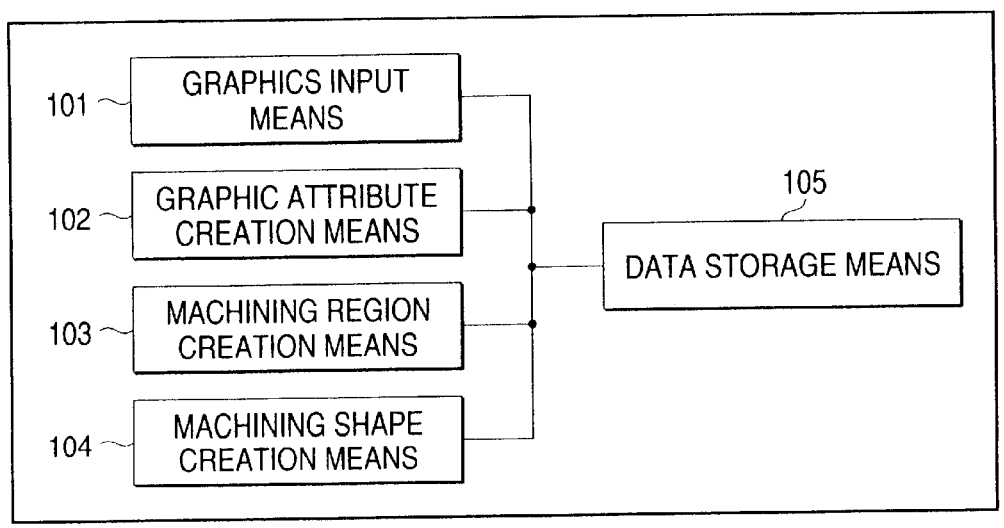
FIG. 14 is a block diagram showing a configuration example of the conventional art.

Then, in final step ST14, the boring regions having the same machining data are grouped respectively on the basis of the bore diameters, the machine shafts, the heights of the end surfaces (upper surface and lower surface), and the bore kinds which are each the machining data about the shapes of each the boring region as shown in Table 1. That is, the boring regions 19, 23, 27 and 29 are classified into group 1 shown in FIG. 8, and the boring regions 17, 20, 25 and 28 are classified into group 2 shown in FIG. 9, and the boring regions 24 and 26 are classified into group 3 shown in FIG. 10, and the boring regions 16 and 18 are classified into group 4 shown in FIG. 11, and the boring region 22 is classified into group 5 shown in FIG. 12, and the boring region 21 is classified into group 6 shown in FIG. 13, respectively.

According to the embodiment of the invention described above, the work material is machined in the machining finish shape, so that provision of machining information can be simplified by providing the machining information (machining data for boring) not one by one every multiple boring regions but in group units.

In the embodiment described above, the boring regions are extracted by calculating the difference between the shape of the work material shown in FIG. 4 and the three-dimensional machining finish shape shown in FIG. 2, but the boring regions can be extracted directly from the three-dimensional machining finish shape shown in FIG. 2 and this is included in the invention as a matter of course. Also, the cylindrical shape is described as the shapes of the boring regions, but the shape is not limited to this cylindrical shape and maybe, for example, an elliptic shape. Further, the boring can be applied in the case of laser beam machining other than the cutting.

According to first to fourth configurations of the invention, by providing each means such as extraction, analysis and classification of boring regions, when a work material for boring is machined in a predetermined machining finish shape, machining information (machining data for boring) can be simply provided by giving the machining information not one by one every multiple boring regions but in group units.

What is claimed is:

1. A machining region data creation apparatus for decoding inputted three-dimensional shape data to create machining data for machining a work piece based on the decoding, comprising:

machining finish shape input means for receiving three-dimensional finish shape data, machining region extraction means for extracting shapes and features of machining regions based on the three-dimensional finish shape data, machining region analysis means for analyzing the shapes and the features of the machining regions based on three-dimensional shape data of the machining regions and recognizing cylindrically-shaped machining regions as boring regions, and boring region classification means for classifying into a group boring regions having identical features, the features including a bore diameter, a bore end height for each end of the bore, a machine shaft direction, and whether the bore is a through bore.

2. The machining region data creation apparatus as defined in claim 1, wherein said machining region analysis means comprises means for calculating bore diameters of the boring regions and directions of machine shafts.

3. The machining region data creation apparatus as defined in claim 1, wherein said machining region analysis means determines that a cylindrically-shaped machining region having a diameter larger than a reference diameter is not a boring region.

4. A machining region data creation method for decoding inputted three-dimensional shape data to create machining data for machining a work piece based on the decoding, comprising:

inputting three-dimensional finish shape data, extracting shapes and features of machining regions based on the three-dimensional finish shape data, analyzing the shapes and the features of the machining regions based on three-dimensional shape data of each machining region and recognizing cylindrically-shaped machining regions as boring regions, and classifying into a group the boring regions having identical features, the features including a bore diameter, a bore end height for each end of the bore, a machine shaft direction, and whether the bore is a through bore.

5. The machining region data creation method as defined in claim 4, further comprising calculating bore diameters of the boring regions and directions of machine shafts.

6. The machining region data creation method as defined in claim 4, further comprising determining that a cylindrically-shaped machining region having a diameter larger than a reference diameter is not a boring region.

* * * * *